B. W. HOWARD.
VEHICLE.
APPLICATION FILED OCT. 11, 1920.
1,379,567.
Patented May 24, 1921.
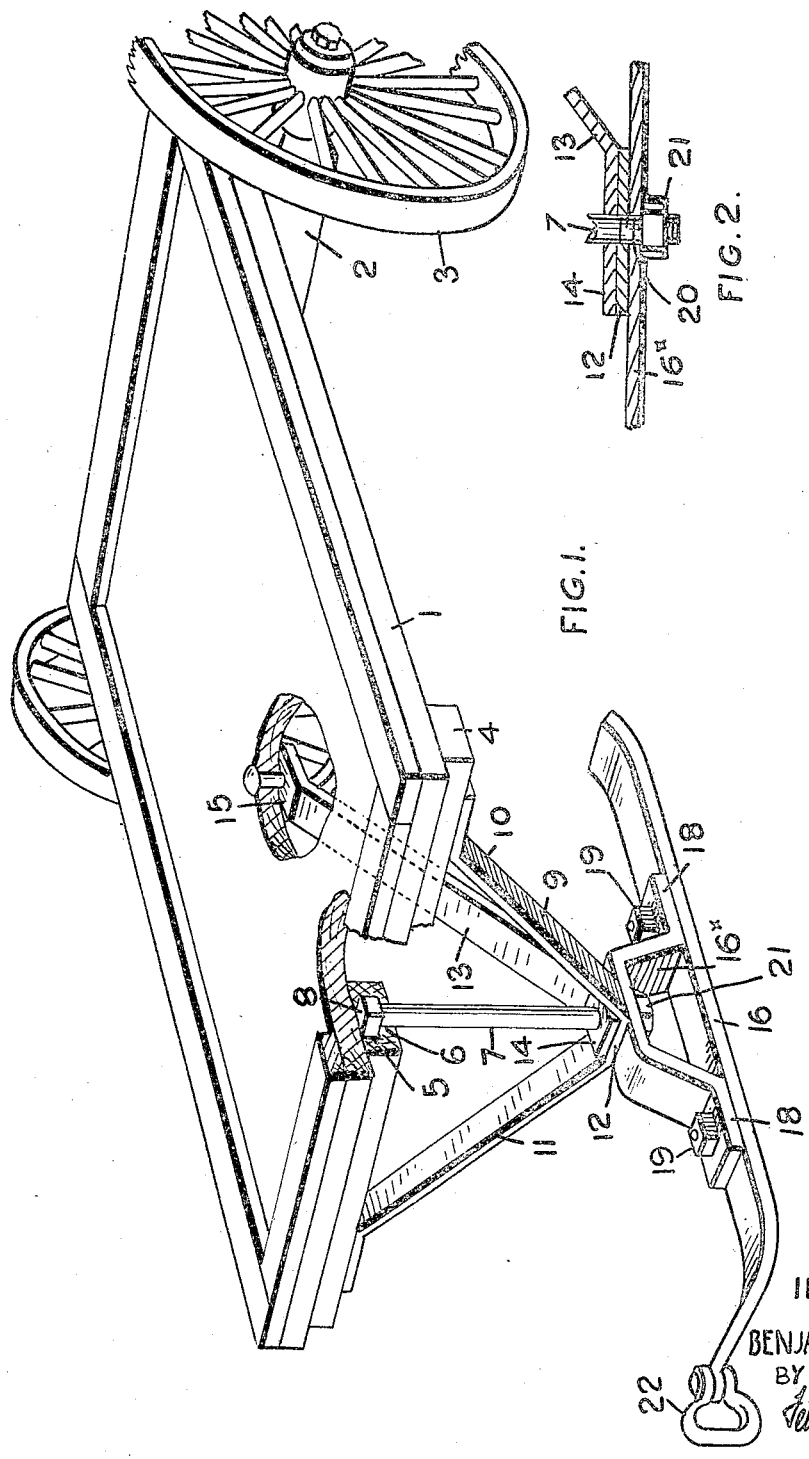
INVENTOR
BENJAMIN W. HOWARD
BY

UNITED STATES PATENT OFFICE.

BENJAMIN WEST HOWARD, OF NEWMARKET, ONTARIO, CANADA.

VEHICLE.

1,379,567.        Specification of Letters Patent.      Patented May 24, 1921.

Application filed October 11, 1920. Serial No. 416,223.

*To all whom it may concern:*

Be it known that I, BENJAMIN WEST HOWARD, of the town of Newmarket, in the county of York, in the Province of Ontario, Canada, have invented certain new and useful Improvements in Vehicles, of which the following is the specification.

My invention relates to improvements in vehicles, and the object of the invention is to devise in a vehicle having a front runner adapted to slide in the ground in place of the usual wheels, means for forming a turnable support for the runner so that the runner is held rigidly in position and yet will allow of its free swinging movement independently of the vehicle frame, and it consists essentially of the arrangement and construction of parts as hereinafter more particularly explained.

Figure 1 represents the perspective view of my vehicle parts being broken away to exhibit the construction thereof.

Fig. 2 is a sectional detail through the runner support.

In the drawings like characters of reference indicate the corresponding parts in each figure.

1 indicates the vehicle body which consists of a flat platform to which the rear axle 2 is secured. 3 are wheels mounted upon the rear axle 2. 4 is a cross bar extending across the front of the platform and secured to the lower face thereof. 5 is a recess formed in the inner face of the bar 4 centrally thereof, and 6 is an orifice extending from such recess through the bar. 7 is a bolt rod forming a depending stem. The bolt rod 7 extends through the orifice 6 and is provided with a head 8 fitting the recess 5. 9 is an arched brace, the side members 10 and 11 of which extend to the bar 4 in proximity to each end thereof, the lower ends of the members 10 and 11 being connected together by a horizontal portion 12. 13 is a rearwardly inclined brace provided with a horizontal lower end 14 fitting upon the portion 12. The upper end of the brace 13 is secured at 15 to the body 1 of the vehicle. The bolt rod 7 extends freely through the horizontal portions 14 and 12, projecting downwardly therefrom so as to form a turnable support for the runner of the vehicle. The brace members 10 and 11 and 13 hold the lower end of the bolt rod absolutely rigid preventing any movement thereof. 16 is the body of the runner which is provided with a rigid bearing $16^x$ which is formed by a separate bracket having out-turned portions 18 connected to the runner by bolts 19. The upper face of the rigid portion $16^x$ bears against the lower face of the horizontal portion 12 of the runner support and is provided with a central orifice 20 through which the projecting end of the bolt rod 7 extends. 21 is a nut screwed onto the lower end of the bolt rod being permanently locked thereto in a suitable way. 22 is a clevis pivotally secured to the runner 16 and to which the draft gear is connected.

From this description it will be seen that I have devised a very simple, strong, durable and absolutely rigid means for connecting a runner to the front portion of a vehicle so that it may be turned independently of the vehicle frame and, therefore, permit of the vehicle being drawn easily and smoothly over the surfaces of the ground. As far as the applicant knows a support of this character has never been devised before and it is essential that the runner turn independently of the vehicle frame as it would entail a great deal of extra exertion on the part of the team drawing the vehicle when turning, if it is necessary to turn the whole frame of the vehicle together with the runner when making the turn.

What I claim as my invention is:

In a vehicle, the combination with a vehicle body, rear axle and wheels mounted thereon, of a cross bar secured at the front of the vehicle body and beneath the same and having a recess in its upper face and an orifice extending from such recess, a bolt having a head fitting the recess and depending through the orifice, bracing members extending from each side of the vehicle and terminating in a horizontal interconnecting portion, a rearwardly inclined brace having a horizontal lower end fitting upon the aforesaid interconnecting portion and secured at its upper end to the vehicle body, a runner, an arched bracket secured to the runner through which and the horizontal portions of the bracing members the bolt extends, and a nut secured upon the lower end of the bolt within the arched bracket.

BENJAMIN WEST HOWARD.